United States Patent

[11] 3,611,210

[72] Inventor Charles Theodore
Los Angeles, Calif.
[21] Appl. No. 45,515
[22] Filed June 11, 1970
[45] Patented Oct. 5, 1971
[73] Assignee LTV Ling Altec, Inc.
Anaheim, Calif.

[54] SECTIONALIZED PULSE MODULATOR
7 Claims, 4 Drawing Figs.

[52] U.S. Cl. .......... 332/9, 307/106, 328/67, 331/87
[51] Int. Cl. .......... H03k 3/57
[50] Field of Search .......... 307/106; 328/65, 66, 67; 331/87; 332/9, 12

*Primary Examiner*—John Kominski
*Attorney*—Harry R. Lubcke

ABSTRACT: A solid-state pulse modulator for producing power pulses, the duration of which pulses may be selected by charging one or more of a plurality of series-connected pulse-forming networks (PFN). Desired rectangular pulse shape for each duration of the pulses is retained by dividing the capacitance of the terminating capacitor of each PFN into a basic value that remains connected to the PFN and into a larger terminating value that is charged through a diode when the terminating capacitor is included in the PFN, but which is blocked from receiving a charge by the same diode when there is another PFN following the first one, for the purpose of obtaining pulses of longer duration. Selectively triggerable SCRs that determine pulse duration are connected to each PFN for charging an appropriate number of sections of PFN.

INVENTOR
CHARLES THEODORE
BY Harvey R. Lubcke
AGENT

SECTIONALIZED PULSE MODULATOR

BACKGROUND OF THE INVENTION

This invention relates to an electrical pulse-modulator, and in particular to one for producing output pulses of selectable duration.

In modulators of this type the shape of pulses of differing duration ("width") is seldom ideal. True rectangularity is desired for proper magnetron or equivalent radio frequency tube operation. Heretofore this might have been obtained for one pulse duration, but the distribution of characteristics of the PFN that provided this provided a distorted pulse shape for a pulse of either longer or shorter duration.

This situation appears to have been accepted as inevitable by the prior art, with at best a compromise between the shapes obtainable for pulses of different durations from one modulator device. In such a compromise none of the shapes have been an approach to the ideal.

SUMMARY OF THE INVENTION

With this invention, pulses of excellent rectangularity for each of plural selected durations have been produced by a circuit devoid of manually operable mechanical switches.

As an example, a modulator of two series-connected pulse-forming networks (also known as transmission lines having lumped constants) are selectively charged depending upon the duration ("width") of the output pulse desired by selectively triggerable silicon-controlled-rectifiers (SCR) connected to each network section. More specifically the SCRs are connected to the charging reactor and individually to terminating capacitors of each network section.

The capacitor at the end of each network section is provided in two parts; one typically having twice the capacitance and termed the terminating capacitor, while the other having unit capacitance and termed the basic terminating capacitor. The former capacitor is connected to its PFN section through a unilateral conductor, while the latter is permanently connected.

When a pulse of short duration is desired the SCR connected to the terminating capacitor of the first PFN section is triggered. Both that capacitor and the basic terminating capacitor are charged and subsequently discharged to provide a rectangular pulse of short duration.

When a pulse of longer duration is desired the SCR connected to the terminating capacitor of the second PFN section is triggered (only). Now the unilateral conductor of the first PFN section is so poled as to block both the charging and the discharging of the terminating capacitor of that section. Thus, what is now the center of the longer PFN (of two sections) has only the basic terminating capacitor connected in circuit, and the pulse of longer duration also has a desirable rectangular shape rather than having an upward hump over the latter portion thereof. A second unilateral conductor connects the first PFN section to the second PFN section, so that the latter will not be charged at all when the former is charged but so that both will be charged and subsequently discharged when the second PFN is charged.

DESCRIPTION OF THE PREFERRED EMBODIMENT

Figure 1:
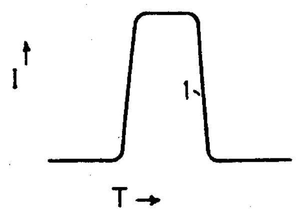
FIG. 1 shows the waveform of a pulse of short duration.

In FIG. 1 numeral 1 identifies a current pulse from a modulator according to this invention having a desirable rectangular shape. Such a pulse might have a time duration (width) of 0.5 microsecond ($\mu s$).

A need exists for pulse modulators having plural selectable widths and preferred embodiments provide selection of the pulse width by means of electrical signals rather than by mechanical manual switching.

Such a modulator has been provided by B. Thompson and E. Perusse in their U.S. Pat. application, Ser. No. 13,546, filed Feb. 24, 1970, entitled, "Variable Pulse-Width Pulse-Modulator," and assigned to the same assignee as the present application. However, it was found in producing such modulators that the values of the elements of the pulse-forming networks were required to be compromised in order to give approximately rectangular pulses for each of plural widths. These were not as rectangular as desired.

Herein, greater pulse width is accomplished by increasing the number of inductor-capacitor sections comprising the pulse-forming network. In the circuit of FIG. 4 the pulse of FIG. 1 is produced by employing the sections at the left half of the network shown. When greater pulse width is desired, as shown by the pulses of FIGS. 2 or 3, then the sections at the right half of the whole network are also included.

In order to obtain desired rectangularity of the pulses when a pulse modulator of fixed pulse length is constructed, the capacitance of the terminating capacitor of the group of sections employed is significantly increased over that of intermediate capacitors. However, when the PFN is extended to give pulses of greater width the waveshape shown generally at 2 in FIG. 2 is obtained. This shape is far from what is desired.

Figure 2:
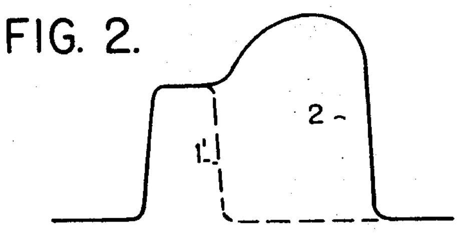
FIG. 2 shows the waveform of a pulse of longer duration according to the prior art.

The shape of the pulse of FIG. 1 is dotted-in at 1′ in FIG. 2 for the trailing edge. The initial shape of both pulses 1 and 2 is the same as the initial part of pulse 1. It is seen that shortly after what otherwise would be the trailing edge of pulse 1 there is a marked rise in the shape of pulse 2, and that rectangularity is lost.

Figure 3:
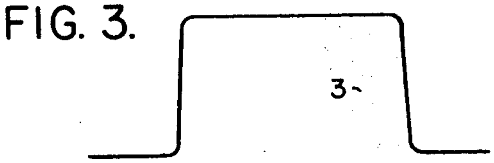
FIG. 3 shows the waveform of a pulse of longer duration according to the present invention.
Figure 4:
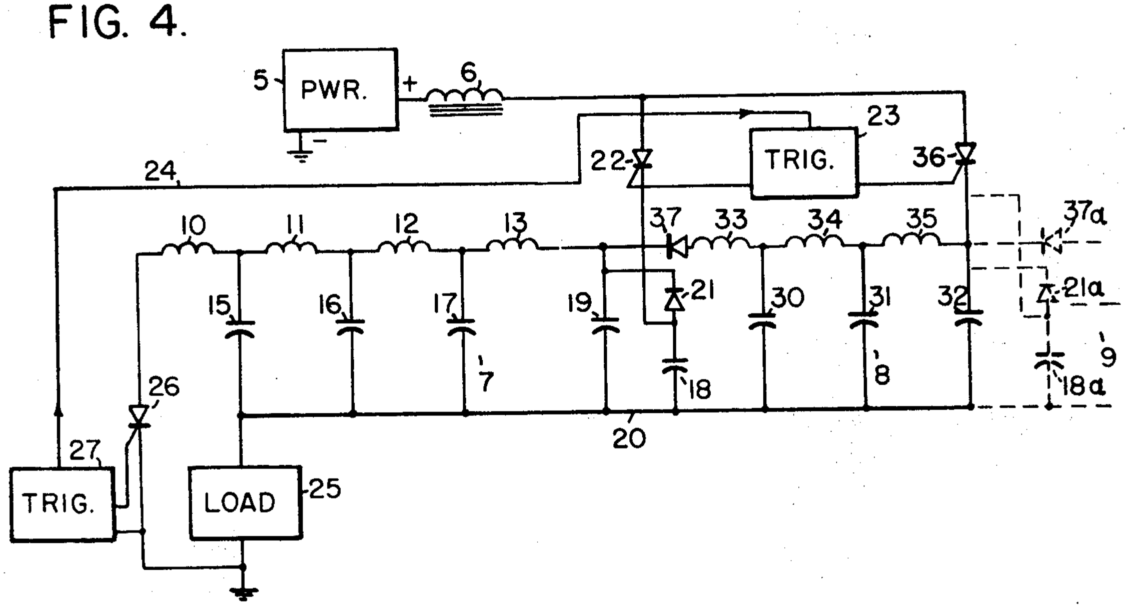
FIG. 4 is the schematic circuit diagram of a variable-width pulse-modulator according to this invention.

In FIG. 3, waveform 3 shows the essentially rectangular wide pulse obtained without manual switching according to this invention. By means of two diodes the capacitance of the terminating capacitor is reduced to that of an intermediate capacitor upon the longer PFN being charged through a different path than that employed for the short PFN.

Considering now FIG. 4, certain known entities are shown in block form, such as a source of electric power 5. This is normally an AC to DC power supply having voltage of a few hundred volts and a current capability commensurate with the power output required of the modulator. The positive terminal thereof is connected to one terminal of charging reactor 6, the inductance of which is selected according to the pulse repetition rate in order to resonantly charge the PFN in one-half cycle during the interval between pulses.

The short PFN is generally represented by numeral 7 and the extended PFN by numeral 8. In a typical application which exploits the current-carrying capabilities of SCRs, the characteristic impedance of these networks is very low, of the order of 0.02 to 0.05 ohms. Accordingly, the inductance of the series inductors is low; a fraction of a microhenry ($\mu h$). In order to obtain the pulse shapes according to this invention with the examples given, the several inductors are separate; i.e., they are not coupled as to their magnetic fields. A typical inductor, such as 11 or 12, may be formed of about three turns of self-supporting wire, with a solenoidal diameter of the order of three-eighths inch. First inductor 10 has an inductance approximately half that of inductor 11 or 12 and last inductor 13 has an inductance approximately five-eighths that of inductor 11 or 12.

Capacitors 15, 16, 17, 19 are each of the same intermediate value of capacitance, typically within the range of from 0.5 to 1 $\mu f$. Capacitor 19 is the basic terminating capacitor of the first PFN. Capacitor 18 is termed the terminating capacitor of the first PFN. It is connected to the common return bus 20, along with the other capacitors, but is special in that the opposite terminal thereof is connected to the anode of diode 21, the cathode of which diode is connected to the common connection between inductor 13 and capacitor 19.

The so-called opposite terminal of capacitor 18 is also connected to the cathode of triggerable solid-state means 22, which may be an SCR, the anode of which is connected to charging reactor 6 for accepting electrical energy therefrom. The trigger of SCR 22 is connected to trigger means 23, which is typically a one-shot multivibrator delay circuit. It accepts trigger pulses via conductor 24 from basic triggering entity 27, and after its delay, which corresponds to the recovery period required for discharge device 26, it triggers SCR 22. Elements 26 and 27 are detailed later.

SCR 22 is conductive during the time of charging of PFN 7, when that short PFN is the only one that is to be charged according to this invention. The conductivity is continuous during the resonant charging of the PFN, as has been mentioned above, and thereafter ceases.

The foregoing constitutes a complete PFN and charging means, having a single (short) pulse width.

Load 25 constitutes the entity within which the modulator pulses are put to a useful purpose. This may include a voltage step-up transformer and a magnetron radio-frequency-producing power vacuum tube. The load is connected between common bus 20 and ground (or an equivalent ground). Also connected to ground is the cathode of triggerable discharge means 26, as a SCR of relatively high momentary current capacity. The anode of discharge means 26 is connected to inductor 10, so that when this means conducts the circuit is completed from PFN 7 through load 25 and the network is discharged through the load.

Trigger block 27 provides a brief pulse at the repetition rate of the power output pulses to be formed. This pulse is impressed upon the trigger of SCR means 26 for initiating anode-cathode conduction. Block 27 may represent a source of repetition rate pulses obtainable from associated apparatus, or it may be a unijunction transistor oscillator.

When a second pulse width is to be made available, PFN 8 is brought into play in addition to PFN 7.

Intermediate capacitors 30, 31 of PFN 8 have the same capacitance as capacitors 16, 17 of PFN 7; whatever this may be, depending upon the required impedance of the PFN, the pulse repetition rate, and so on. Assuming that PFN 8 is the last network to be added for increasing the width of the pulse, capacitor 32 has the combined capacitance of prior terminating capacitor 18 and basic terminating capacitor 19; i.e., 3 $\mu f$ in the example given. If PFN 8 is not to be the last network, as signified by the dotted elements and the dashed line to the right thereof in FIG. 4, then capacitor 32 is separated into two capacitors corresponding to capacitors 18 and 19 and corresponding diodes **21*a* and 37*a* provided, as will be evident from the terminating part of PFN 7**. It will be understood that additions to the network as a whole can be repeated almost at will.

In the same manner as for PFN 7, intermediate inductors 33 and 34 of PFN 8 have the same inductance as previous intermediate inductors 11 and 12, and that inductor 35 has the same inductance as inductor 13.

The switchless alteration of the width of the power output pulse, as from the width of pulse 1 of FIG. 1 to that of pulse 3 of FIG. 3, is accomplished within trigger entity 23. For the wider pulse a second SCR is triggered instead of SCR 22. The second SCR connects from the charging reactor to terminating capacitor 32 and also to inductor 35. The selection of triggering from SCR 22 to SCR 36 is accomplished according to the invention of the patent application previously identified herein.

Second unilateral conductive means 37, as the diode shown, is connected from PFN 8 to PFN 7, with the anode of the diode connected to PFN 8. It is seen that the positive charging voltage, passed by SCR 36 and passing through network inductors 35, 34 and 33, is of the correct polarity to cause current flow through diode 37. In this manner PFN 7 is charged in a normal manner, along with PFN 8. In effect, PFN 7 and PFN 8 are one network of greater length than either individually. At the same time it is to be noted that first unilateral conductive means 21 is poled to oppose passage of current passed through second unilateral conductive means 37 and so terminating capacitor 18 is not charged.

When only PFN 7 is charged through SCR 22, it is seen that second unilateral conductive means 37 is back-biased and so current will not flow into PFN 8. Thus, these two elements, 21 and 37, fortuitously perform a very useful PFN switching function. Moreover, upon discharge of the combined PFNs 7 and 8, second unilateral conductive means 37 allows the charge from PFN 8 to freely pass to and hence through PFN 7 so that the desired total discharge of both networks is accomplished.

Greater pulse lengths than the relatively short ones chosen for the examples herein are equally possible according to the technology of this invention. This would be accomplished by increasing the capacitance of the several capacitors 15, 16, 17, 18, 19, 30, 31, 32, etc.

Also, it is not required that PFN 8 have the same circuit values as PFN 7, thus doubling the width of the pulse. By employing different circuit values the longer pulse may be less or reasonably more than twice the duration of the original pulse.

I claim:

1. An electrical variable pulse-width pulse-modulator comprising:

a. charging means including a reactor, b. plural chargable series-connected pulse-forming networks, each having a terminating capacitor, c. plural triggerable solid state means connected from said reactor to each said terminating capacitor, d. a load connected to a first of said networks at the end opposite to the terminating capacitor thereof, e. first unilateral conductive means connected to the terminating capacitor of said first network, f. a basic terminating capacitor connected in shunt to both said first unilateral conductive means and said terminating capacitor of said first network, and g. second unilateral conductive means connected in opposite polarity to said first unilateral means and to a second said network, whereby said terminating capacitor of said first network is charged when only said first network is charged, and is not charged when more networks than said first network are also charged.

2. The modulator of claim 1 in which;

a. said first unilateral conductive means is a diode connected with the anode thereof to said terminating capacitor of said first network.

3. The modulator of claim 1 in which;

a. said second unilateral conductive means is a diode connected with the cathode thereof to said basic terminating capacitor of said first network.

4. The modulator of claim 1 in which;

a. said pulse-forming network has plural inductors, and b. the inductor connected to said basic terminating capacitor has an inductance of the order of half the inductance of the inductor adjacent to it.

5. The modulator of claim 1 which includes;

a. a third series-connected pulse-forming network, b. a third unilateral conductive means connected to the terminating capacitor of the second network, and c. a fourth unilateral conductive means connected in opposite polarity to said third unilateral conductive means and to said third network.

6. The modulator of claim 1 in which;

a. said basic terminating capacitor has a smaller capacitance than the capacitance of said terminating capacitor of said first network.

7. The modulator of claim 4 in which;

a. said smaller capacitance is of the order of half the capacitance of said terminating capacitor.